US 6,396,893 B1

(12) United States Patent
Carter et al.

(10) Patent No.: US 6,396,893 B1
(45) Date of Patent: May 28, 2002

(54) APPARATUS AND METHOD FOR ADJUSTING THE WEIGHT OF A VELOCITY LIMITER FOR A CONTROL ROD OF A NUCLEAR REACTOR

(75) Inventors: Thomas F. Carter; James E. Holden; Richard E. Kingston; Gary S. Martin; John G. Pistolis, all of Wilmington; James F. McLeod, Hampstead; Michael J. Sullivan, Wilmington, all of NC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/427,937

(22) Filed: Oct. 27, 1999

(51) Int. Cl.[7] ................................................ G21C 7/113
(52) U.S. Cl. ........................ 376/327; 376/260; 376/335
(58) Field of Search ................................. 376/327, 335, 376/260

(56) References Cited

U.S. PATENT DOCUMENTS 4,624,826 A * 11/1986 Cearley et al. ............. 376/327
4,676,948 A * 6/1987 Cearley et al. ............. 376/333
5,883,931 A * 3/1999 Holden et al. .............. 376/327

FOREIGN PATENT DOCUMENTS

| JP | 0060487 | * | 5/1978 | ............ G21C/7/10 |
| JP | J6 1095277 A | * | 10/1984 | ............ G21C/7/10 |
| JP | J6 2254097 | * | 11/1987 | ............ G21C/7/10 |
| JP | J6 2254098 | * | 11/1987 | ............ G21C/7/10 |

* cited by examiner

Primary Examiner—Michael J. Carone
Assistant Examiner—John Richardson
(74) Attorney, Agent, or Firm—Nixon & Vanderhye

(57) ABSTRACT

The control rod includes an upper absorber section and a lower velocity limiter comprised of a socket, a vane, a transition piece and a set of fins. To adjust the weight of the control rod, lighter and heavier sets of fins, as well as lighter and heavier transition pieces are provided. By suitable selection of the lighter and heavier sets of fins and the lighter and heavier transition pieces, the weight of the velocity limiter can be selectively adjusted in accordance with the weights of differently designed sections to obtain a predetermined control rod weight. Additionally, the heavier transition piece may have material removed therefrom to decrease its weight to provide an infinite adjustment of weight within a predetermined range of weights for the velocity limiter.

17 Claims, 4 Drawing Sheets

APPARATUS AND METHOD FOR ADJUSTING THE WEIGHT OF A VELOCITY LIMITER FOR A CONTROL ROD OF A NUCLEAR REACTOR

BACKGROUND OF THE INVENTION

The present invention relates generally to control rods for nuclear reactors having an upper, generally cruciform cross-section and a lower velocity limiter secured to the upper section and particularly relates to apparatus and methods for selectively adjusting the weight of the velocity limiter whereby the overall control rod weight can be adjusted.

Control rods in nuclear reactors perform dual functions of power distribution shaping and reactivity control. The rods enter from the bottom of the reactor and are typically connected to bottom-mounted, hydraulically-actuated drive mechanisms to allow axial positioning for reactivity regulation or rapid SCRAM insertion. The control rods are generally cruciform in cross-sectional shape, with each blade or wing of the rod typically containing tubes filled with a nuclear poison such as boron carbide or hafnium. The lower portion of the control rod comprises a velocity limiter disposed in a guide tube. Velocity limiters are conventionally designed to limit the drop velocity to a selected velocity, for example, 3.11 feet per second, minimize drag resistance during a SCRAM event, provide an interface between the control rod and control rod guide tube and provide a coupling between the control rod blade absorber sections and the control rod drive.

Historically, a single velocity limiter was developed to satisfy the foregoing design criteria. Newer control blade absorber sections, however, have been designed, each with widely differing load patterns and neutron-absorbing materials. This has resulted in some control rod absorber sections being heavier than the original design and some being lighter. Because control rod weight limits are defined by what the specific plant is licensed to use, two different types of velocity limiters became available for use with any one of the different control rod designs. Specifically, a light and a heavy velocity limiter were designed for use with any one of the control rod designs. The selection of which of the lighter or heavier velocity limiters for a particular control rod design was based on the weight of the control blade absorber section, i.e., a light velocity limiter was used with a heavier absorber section and, conversely, the heavy velocity limiter was used with a lighter absorber section. There has therefore developed a need for a single velocity limiter which enables the weight of the limiter to be modified without affecting the critical external geometric or fluid mechanical properties of the control rod such that the overall weight of the control rod can be closely controlled to meet design and licensing specifications.

BRIEF SUMMARY OF THE INVENTION

In accordance with a preferred embodiment of the present invention, a velocity limiter for a control rod for a nuclear reactor is provided which can be adjusted in weight within a predetermined range such that the velocity limiter with a selectively adjusted weight can be used with any one of the various and different control rod absorber section designs. The specific weight of the velocity limiter is determined by the weight of the neutron absorber section, i.e., with a heavier absorber section, a lighter velocity limiter is provided and, conversely, with a lighter absorber section, a heavier velocity limiter is provided.

To provide a substantially infinitely adjustable weight of velocity limiter within a predetermined range of weights, the present invention provides, as part of the velocity limiter, a standard vane, a set of light or heavy transition pieces, a socket and a set of light or heavy fins. By selecting one or the other of the light or heavy transition pieces and combining the selected transition piece with one or the other of a selected one of the light or heavy sets of fins, an approximation of the desired weight for the velocity limiter and, hence, the overall control rod, can be obtained. To provide a further fine adjustment in weight to match a target or originally licensed control rod weight, the heavy transition piece can be modified such that its weight lies within a range from approximately the weight of the light transition piece to the weight of the heavy transition piece without modification. Each transition piece includes an enlarged diameter central section having a bore therethrough. The heavier transition piece has a small bore whereas the light transition piece has a radially enlarged bore. By removing material from within the bore of the heavy transition piece, the weight of the heavy transition piece can be adjusted downwardly within a weight range substantially between the weight of the light and heavy transition pieces. Consequently, by combining the heavier transition piece with the socket and one of the sets of fins, those elements can be assembled with the vane and socket to form a velocity limiter of desired weight such that the overall weight of the control rod approaches the target or licensed weight.

In a preferred embodiment according to the present invention, there is provided a method of adjusting the weight of a control rod for use in a nuclear reactor, the control rod having an upper, generally cruciform absorber section and a lower velocity limiter attached to the section and including a vane, a transition piece and fins, comprising the steps of providing first and second sets of fins with the second set of fins being heavier than the first set of fins, providing first and second transition pieces, with the second transition piece being heavier than the first transition piece, selecting one of the first and second sets of fins and one of the first and second sets of transition pieces and forming a velocity limiter for the control rod containing the vane and the selected ones of the fins and the transition pieces thereby selectively adjusting the weight of the control rod.

In a further preferred embodiment according to the present invention, here is provided apparatus for selectively adjusting the weight of a control rod for use in a nuclear reactor comprising an upper control rod body, a lower velocity limiter including a vane, a first set of fins, a second set of fins heavier than the first set of fins, a first transition piece, a second transition piece heavier than the first transition piece, the control rod being formed with one of the first and second sets of fins secured to the vane and one of the first and second transition pieces secured to the vane whereby a control rod of selected adjusted weight is formed.

DETAILED DESCRIPTION OF THE INVENTION

Figure 1:
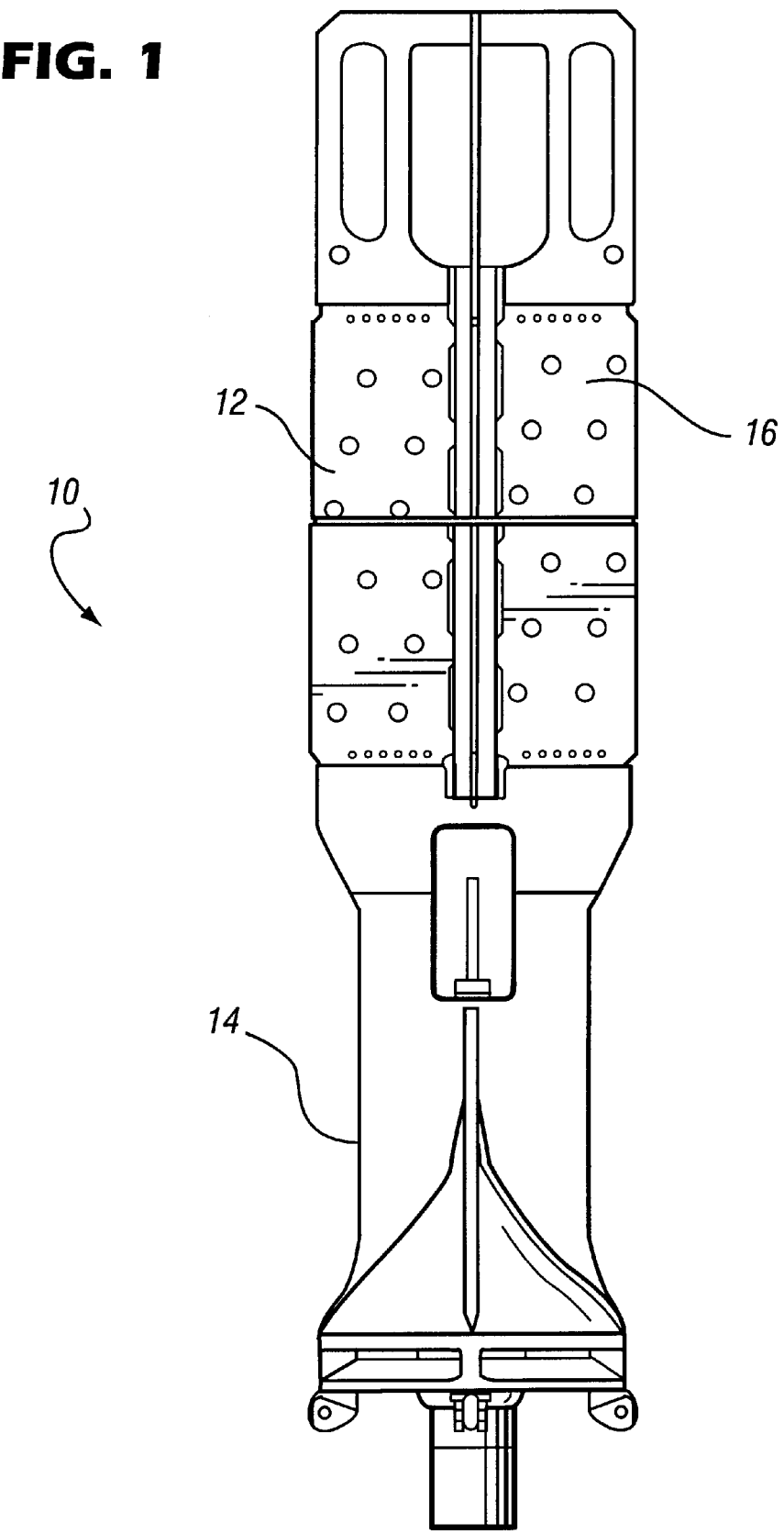
FIG. 1 is a side elevational view of a control rod constructed in accordance with the present invention.

Referring now to FIG. 1, there is illustrated a control rod constructed in accordance with the present invention and including an upper cruciform absorber section or body 12 and a lower velocity limiter section 14. The blades or wings 16 of the upper section 12 typically include tubes filled with a neutron poison such as boron carbide, the tubes conventionally extending vertically within each of the blades 16. The lower velocity limiter is typically mounted in a control rod guide tube, not shown, for movement in a vertical direction between the correspondingly-shaped cruciform portions in the interstices of the core among the fuel bundle assemblies. The control rod is typically under hydraulic fluid control for movement vertically to allow axial positioning of the absorber section adjacent to the fuel bundle assemblies in the event of a SCRAM or for reactivity regulation.

Figure 3:
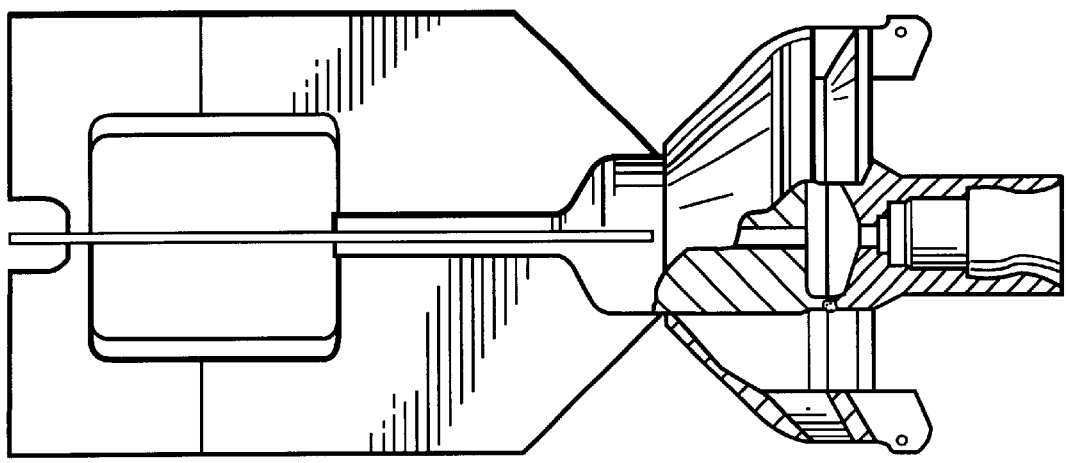
FIGS. 2 and 3 are enlarged portions of light and heavy velocity limiters, respectively, parts being broken out and in cross-section for ease of illustration.
Figure 2:
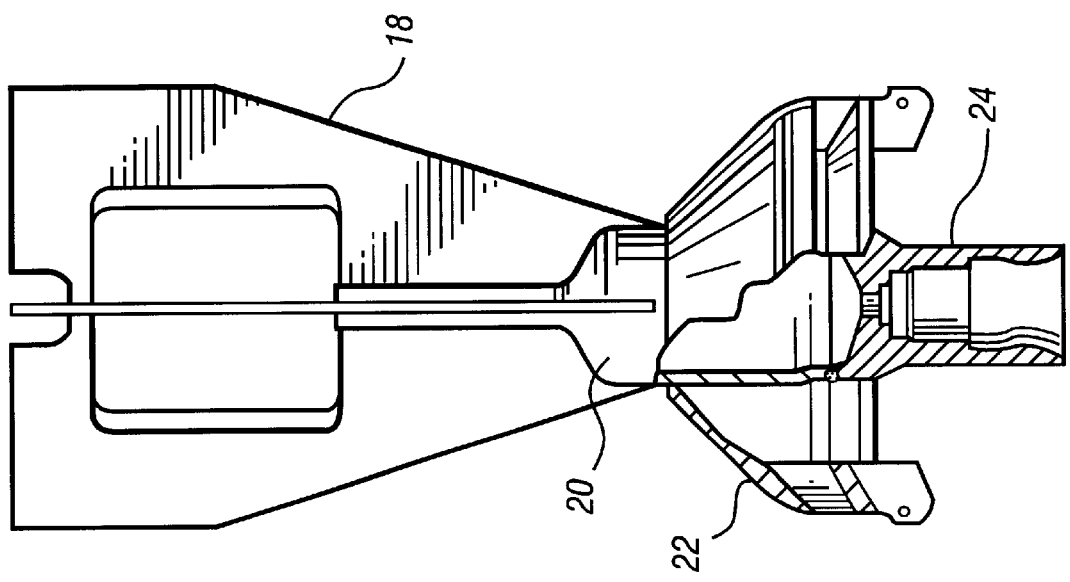

Referring to FIGS. 2 and 3, the component parts of the velocity limiter 14 include a set of fins 18 aligned vertically with the blade 16 of the upper section of the control rod and transition piece 20 and a vane 22, the transition piece mounting a socket 24 at its lower end. The socket 24 is adapted for connection to a control rod drive, not shown, whereby the control rod can be vertically positioned relative to the fuel bundle assemblies.

Figure 4:
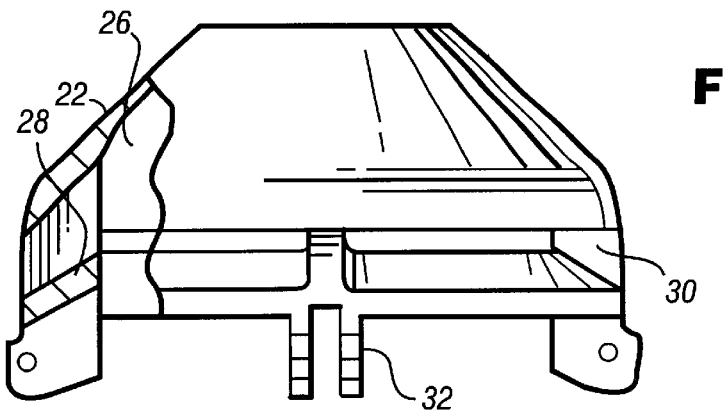
FIG. 4 is an enlarged side elevational view of a vane employed in the velocity limiter hereof with parts broken out and in cross-section.

The vane 22 is illustrated in FIG. 4 and includes a generally frustoconical section having a hollow interior 26 open at its bottom for receiving the coolant/moderator. An annular turning vane 28 is disposed in the vane 22 and defines an annular flow channel 30 between the vane 28 and the upper portion of vane 22. The vane 28 mounts a plurality of lugs 32 which mount rollers, not shown, for engaging along the interior surfaces of the control rod guide tube whereby the control rod can be displaced vertically.

Figure 5A:
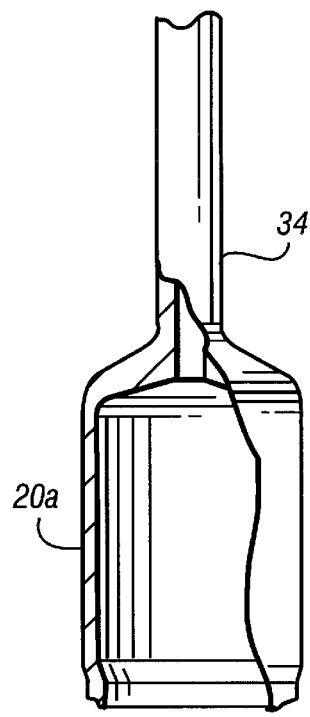
FIGS. 5A and 5B are fragmentary side elevational views with parts broken out and in cross-section of light and heavy transition pieces, respectively, for selective use in the velocity limiter hereof.
Figure 5B:
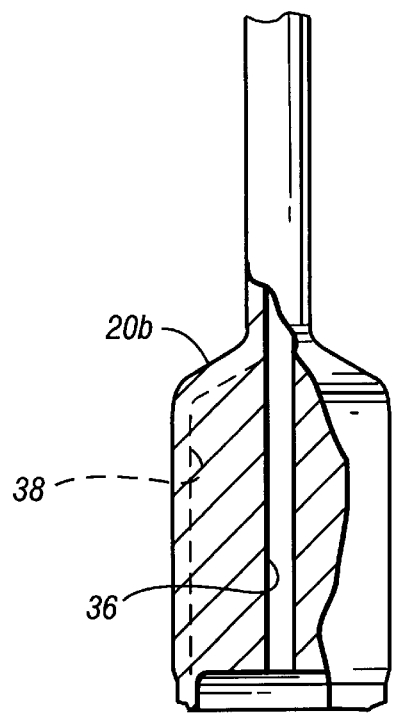
Figure 6:
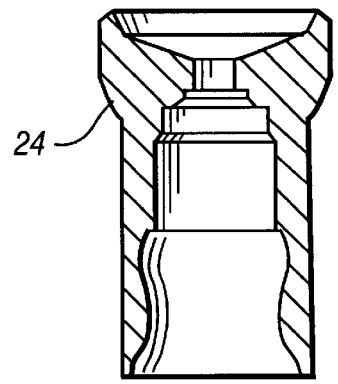
FIG. 6 is a cross-sectional view of a socket employed in the present invention.
Figure 7A:
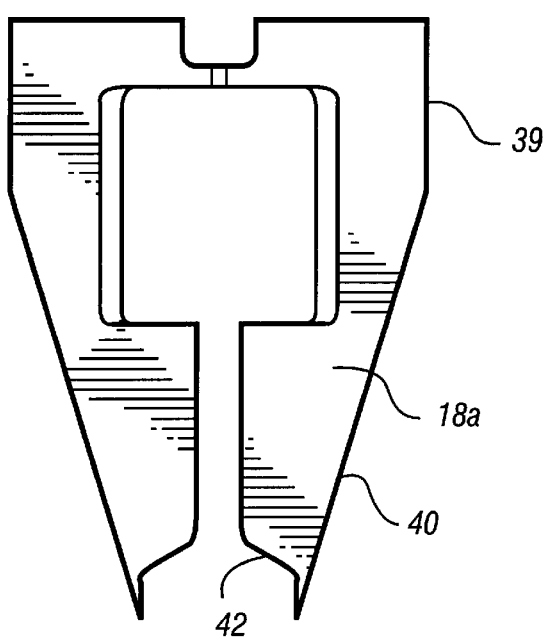
FIGS. 7A and 8A are side elevational views of light and heavy sets of fins, respectively, with FIGS. 7B and 8B illustrating corresponding respective halves of those fins.
Figure 7B:
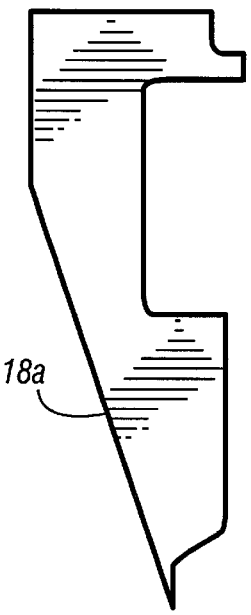

Referring to FIGS. 5A and 5B, two separate transition pieces 20a and 20b are provided, only one of which is employed in the formation of the velocity limiter for a particular control rod. In FIG. 5A, the transition piece 20a is generally in the form of a hollow cylinder having a sleeve 34 projecting from its upper end. The cylinder of the transition piece is of a relatively thin wall. The lower end of the transition piece 20a is secured, for example, by welding to the upper end of the socket 24. In FIG. 5B, there is illustrated a similar transition piece 20b which is heavier than the transition piece 20a of FIG. 5A. Particularly, transition piece 20b is similar in external configuration to the transition piece 20a. However, transition piece 20b is formed of a substantially solid interior with a small axial passageway 36. An imaginary outline 38 of the interior wall of the lighter transition piece 20a is illustrated in the heavier transition piece 20b to indicate the extent of the increase in material and, hence, weight of the heavier transition piece 20b as compared with the lighter transition piece 20a. Transition pieces are preferably formed of a stainless steel material.

Figure 8A:
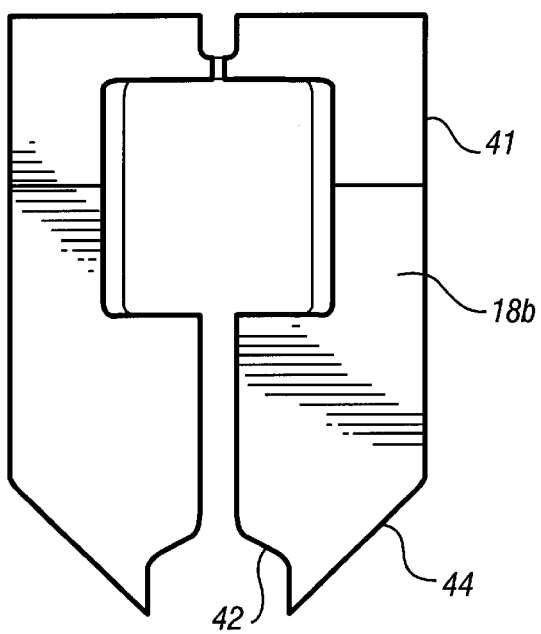
Figure 8B:
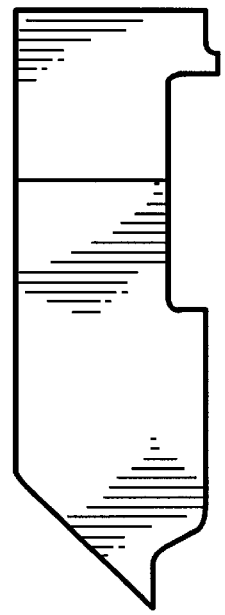

Referring to FIGS. 7A, 7B, 8A and 8B, there are illustrated two sets of fins 18. The first set of fins 18a comprise four fin halves which have short, vertically extending side edges 39 followed by long, downwardly inclined outer edges 40 terminating at their lower ends in contoured edges 42 for connection to the transition piece 20. In FIGS. 8A and 8B, the fins 18b are similarly formed except that the outside vertical edge 41 of each fin extends vertically downwardly to a greater extent than the outside vertical edge 39 of each of fins 18a of FIGS. 7A and 7B. Also, the inclined edge 44, which transitions between the vertical edge and the contoured edge 42 for seating on the transition piece is at a greater downwardly inclined angle to the vertical. Furthermore, the thickness of the fins shown in FIGS. 8A and 8B is substantially greater than the thickness of the set of fins shown in FIGS. 7A and 7B. It will be appreciated that upon comparing the configurations of the fin sets of FIGS. 7A and 7B with those of FIGS. 8A and 8B, the second sets of fins 18b are heavier than the first set of fins 18a. The increase in weight is due solely to the increase in material forming the fins. While there is an increased surface area for the heavier fins 18b as compared with the lighter fins 18a, the external geometry is not altered sufficiently to have significant extent on the fluid mechanical properties of the velocity limiter. It will also be appreciated that four fin halves of the selected set are used at right angles to one another for each control rod.

To provide a control rod of selectively adjustable weight corresponding to a target or licensed weight, the weight of the velocity limiter is determined by the weight of the neutron absorber section, i.e., upper section 12. The total weight of the control rod will be the combined weight of the upper section 12 and the velocity limiter 14. Given the weight of the upper section which can vary substantially with respect to the design of the upper control rod section, the total control rod weight can be adjusted to meet the target or licensing weight by adjusting the weight of the velocity limiter. To accomplish this for a given known weight of the control rod absorber section, a combination of the selected transition pieces and fins will be made to approximate the desired weight. For example, if the upper section of the control rod is heavy, the lightest of the transition pieces, i.e., transition piece 20a, and the lightest of the fin sets 18, i.e., fin set 18a, may be selected for combination with the vane 22 and socket 24. This affords the lightest control rod for the given heavy weight of absorber section. Conversely, for a control rod design having an extremely light absorber section, the heavier velocity limiter 20b may be selected and combined with the heavier set of fins 18b. This affords the heaviest control rod for the given light weight of absorber section. By forming two sets each of heavier and lighter transition pieces and fins interchangeable for use with the vane and socket, it will be appreciated that the weight of the velocity limiter can be varied between a maximum and minimum range and with a mix of the light and heavier fin sets and transition pieces. That is, to meet weights in-between the maximum and minimum weights of the velocity limiter, a different combination of fin sets and transition pieces can be utilized, i.e., a heavy transition piece with a set of light fins or a light transition piece with a set of heavy fins.

Additionally, once a fin set and the heavier transition piece are selected from the light and heavier fin sets and transition pieces, respectively, the weight of the heaviest transition piece can be adjusted, i.e., lowered. Thus, if the heavier transition piece is selected, a weight between it and the weight of the lighter transition piece can be provided by removing material from within the bore of the transition piece 20b. From a review of FIG. 5B, it will be appreciated that more or less of the material within the bore 36 of the heaviest transition piece 20b can be removed, down to the weight of the lightest transition piece 20a. The extent of passable removal of the material is illustrated in FIG. 5B by the material volume between bore 36 and the dashed lines 38. Consequently, greater control over the total control rod weight is achieved by using selected transition pieces and sets of fins and further adjustment of the weight of the transition piece should the heavier transition piece be selected. It will also be appreciated that additional material can be provided the lighter transition piece 20a to render it heavier. For example, weld material could be suitably secured along the interior wall of the transition piece 20a to increase its weight. Accordingly, there has been provided a system for adjusting the weight of a control rod within predetermined maximum and minimum limits to arrive at a target weight.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of adjusting the weight of a control rod for use in a nuclear reactor, the control rod having an upper, generally cruciform absorber section and a lower velocity limiter attached to said section and including a vane, a transition piece and fins interconnecting with one another comprising the steps of:

providing first and second sets of fins with said second set of fins being heavier than said first set of fins;

providing first and second transition pieces, with said second transition piece being heavier than said first transition piece;

selecting one of said first and second fins and one of said first and second sets of transition pieces; and forming a velocity limiter for said control rod containing said vane and said selected ones of said fins and said transition pieces thereby selectively adjusting the weight of the control rod and enabling the formed velocity limiter to be connected to the cruciform section by the fins.

2. A method according to claim 1 including selecting said second heavier transition piece and adjusting the weight of said second heavier transition piece to further selectively adjust the weight of the control rod.

3. A method according to claim 2 wherein the weight of the second heavier transition piece is adjusted by removing material from said heavier transition piece.

4. A method according to claim 3 wherein said transition piece has a generally cylindrical configuration about an axis and a bore through said transition piece along said axis, the weight of the heavier transition piece being adjusted by removing material from within said bore.

5. A method according to claim 1 wherein the difference in weight of said sets of fins is provided solely by a change in size of the first and second sets of fins.

6. A method according to claim 1 including a socket and welding said selected one of said transition pieces and said socket to one another.

7. A method according to claim 1 including selecting said first transition piece and adjusting the weight of said first transition piece to selectively adjust the weight of the control rod.

8. A method according to claim 7 wherein the weight of the first transition piece is adjusted by adding material to said first transition piece.

9. A method according to claim 1 including providing first and second sets of fins of different configurations with the second set being formed of more material than the material forming the first set and selecting said second set of fins.

10. A method according to claim 1 wherein the first and second sets of fins are of different configurations with the second sets of fins being formed of more material than the material of the first set of fins and selecting the first set of fins to selectively adjust the weight of the control rod.

11. A method according to claim 1 including selecting said second set of fins and said heavier transition piece and adjusting the weight of said second heavier transition piece by removing material from said heavier transition piece.

12. A method according to claim 1 including selecting said first set of fins and said first transition piece and adjusting the weight of said first transition piece by adding material to said first transition piece.

13. A method according to claim 1 including selecting said second transition piece and said first set of fins and adjusting the weight of said second heavier transition piece by removing material from said second transition piece.

14. A method according to claim 1 including selecting said second set of fins and said first transition piece and adjusting the weight of said first transition piece by adding material thereto to further selectively adjust the weight of the control rod.

15. The method of adjusting the weight of a control rod for use in a nuclear reactor the control rod having an upper, generally cruciform absorber section and a lower velocity limiter attached to said section and including a vane, a transition piece and fins, interconnecting with one another comprising the steps of:

providing a set of fins;

providing first and second transition pieces, with said second transition piece being heavier than said first transition piece;

selecting one of said first and second transition pieces; and forming a velocity limiter for said control rod containing said vane and said selected one of said transition pieces and said set of fins thereby selectively adjusting the weight of the control rod and enabling the formed velocity limiter to be connected to the cruciform section by the fins.

16. A met hod according to claim 15 including selecting said second heavier transition piece and adjusting the weight of the second heavier transition piece by removing material therefrom.

17. A method according to claim 15 including selecting said firs transition piece and adjusting the weight of said first transition piece by adding material thereto.

* * * * *